US012485054B2

(12) United States Patent
Porwal

(10) Patent No.: US 12,485,054 B2
(45) Date of Patent: Dec. 2, 2025

(54) CREEPING MOTION THERAPY DEVICE

(71) Applicant: Anant Porwal, Bellevue, WA (US)

(72) Inventor: Anant Porwal, Bellevue, WA (US)

( * ) Notice: Subject to any disclaimer, the term of this patent is extended or adjusted under 35 U.S.C. 154(b) by 764 days.

(21) Appl. No.: 17/827,731

(22) Filed: May 29, 2022

(65) Prior Publication Data

US 2023/0381048 A1 Nov. 30, 2023

(51) Int. Cl.
*A61H 1/02* (2006.01)

(52) U.S. Cl.
CPC ......... *A61H 1/0259* (2013.01); *A61H 1/0274* (2013.01); *A61H 2201/1215* (2013.01); *A61H 2201/149* (2013.01); *A61H 2201/1635* (2013.01); *A61H 2201/164* (2013.01); *A61H 2201/5007* (2013.01); *A61H 2203/045* (2013.01); *A61H 2203/0468* (2013.01)

(58) Field of Classification Search
CPC ...... A61H 1/00–0296; A61H 2203/045; A61H 2203/0468; A61H 2203/0412; A61H 2001/0203–0251; A63B 2208/12; A63B 2208/0219; A63B 21/00178; A63B 23/03516; A63B 23/03575
USPC .......................................................... 434/255
See application file for complete search history.

(56) References Cited

U.S. PATENT DOCUMENTS 2,013,520 A * 9/1935 Mcdermott ............ A63B 69/10 482/56
3,362,090 A * 1/1968 Bernard ................... A61H 1/02 601/25
3,363,335 A * 1/1968 Burhns .................... A61H 1/02 601/40
3,460,272 A * 8/1969 Pellicore .................. A61H 1/02 74/615
3,582,069 A * 6/1971 Flick .................... A63B 22/203 601/33
5,224,909 A * 7/1993 Hamilton ......... A63B 23/03575 601/33

(Continued)

FOREIGN PATENT DOCUMENTS

CN 201197864 4/2008
CN 205867044 4/2016

(Continued)

OTHER PUBLICATIONS

KR-200363140-Y1 description translation (Year: 2004).*

*Primary Examiner* — Timothy A Stanis
*Assistant Examiner* — Kira B Daher

(57) ABSTRACT

A creeping motion therapy device promotes proper crawling and includes a motor coupled to a frame. Each of a right paddle and a left paddle are coupled to and slidable relative to the frame. Right and left leg supports are also coupled to and slidable relative to the frame. A linkage assembly is mechanically coupled to a main flywheel assembly mechanically coupled to the motor. Each of the right paddle, the left paddle, the right leg support, and the left leg support is mechanically coupled to the linkage assembly such that the right paddle and the left leg support move alternately backward and forward in unison and the left paddle and the right leg support move in unison in opposite to the right paddle and the left leg support wherein the right paddle, left paddle, right leg support, and left leg support mimic a creeping motion.

12 Claims, 8 Drawing Sheets

(56) References Cited

U.S. PATENT DOCUMENTS

| | | | | | |
|---|---|---|---|---|---|
| 5,407,406 | A * | 4/1995 | Canela | A63B 23/03575 | 601/33 |
| 5,607,374 | A * | 3/1997 | Hesse | A63B 21/4045 | 601/33 |
| 6,080,087 | A | 6/2000 | Bingham | | |
| 2012/0244998 | A1* | 9/2012 | Rao | A63B 23/03575 | 482/70 |
| 2014/0142478 | A1* | 5/2014 | Malaviya | A61H 15/0078 | 601/115 |

FOREIGN PATENT DOCUMENTS

| | | | |
|---|---|---|---|
| CN | 110215089 | | 6/2019 |
| CN | 110860066 | | 12/2019 |
| CN | 111359157 | | 3/2020 |
| KR | 200363140 | Y1 * | 9/2004 |
| WO | WO2016204388 | | 12/2016 |

* cited by examiner

CREEPING MOTION THERAPY DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to therapy devices and more particularly pertains to a new therapy device for moving arms and legs in a creeping motion to promote proper crawling.

(2) Description of Related Art Including Information Disclosed Under 37 CFR 1.97 and 1.98

The prior art relates to therapy devices. Known prior art relates to movement of limbs but lacks coordinated movement of both arms and legs simultaneously in a creeping or crawling motion.

BRIEF SUMMARY OF THE INVENTION

An embodiment of the disclosure meets the needs presented above by generally comprising a motor coupled to a frame. Each of a right paddle and a left paddle are coupled to and slidable relative to the frame. Right and left leg supports are also coupled to and slidable relative to the frame. A linkage assembly is mechanically coupled to a main flywheel assembly mechanically coupled to the motor. Each of the right paddle, the left paddle, the right leg support, and the left leg support is mechanically coupled to the linkage assembly such that the right paddle and the left leg support move alternately backward and forward in unison and the left paddle and the right leg support move in unison in opposite to the right paddle and the left leg support wherein the right paddle, left paddle, right leg support, and left leg support mimic a creeping motion.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
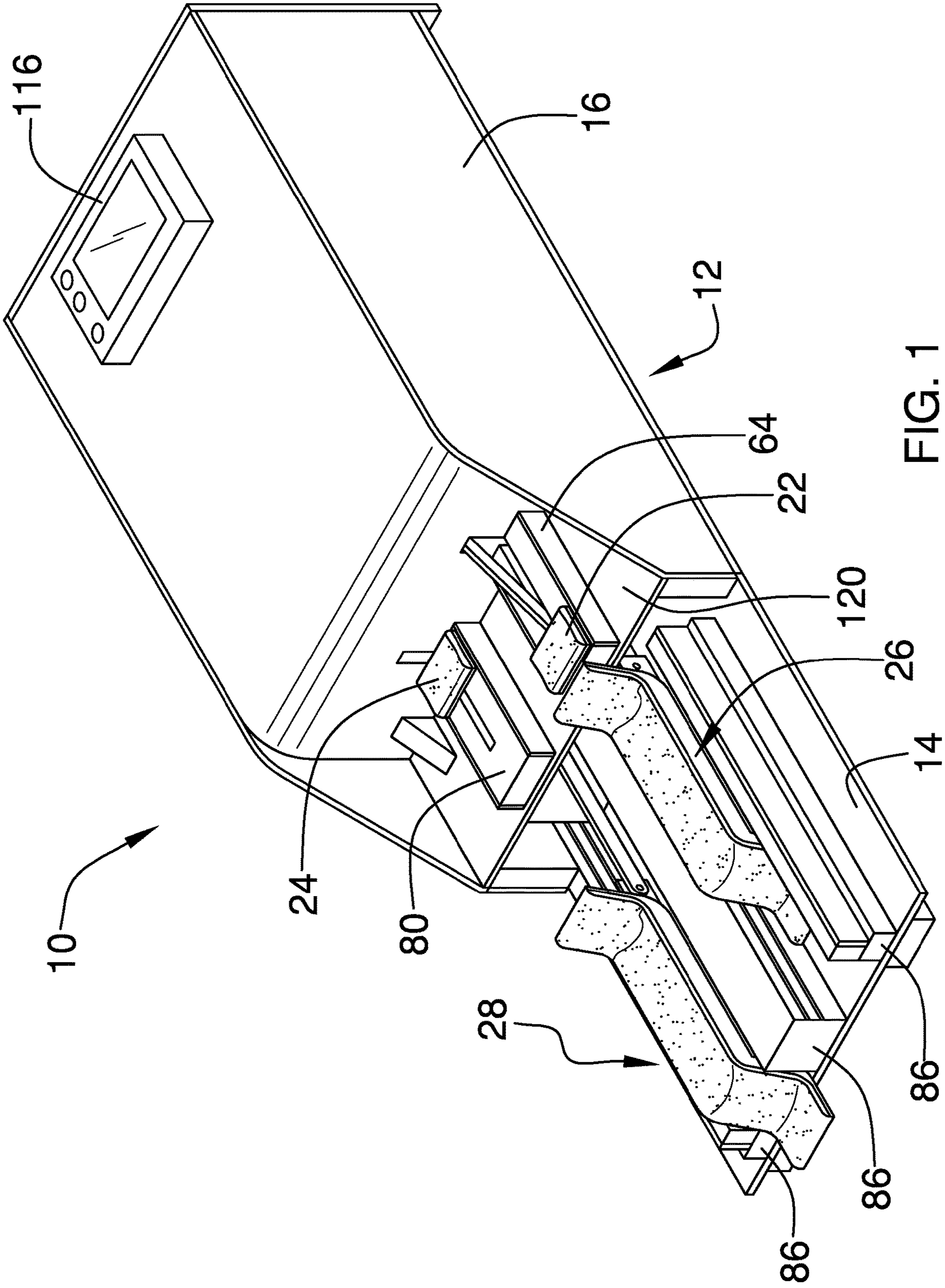
FIG. 1 is a top front side perspective view of a creeping motion therapy device according to an embodiment of the disclosure.
Figure 2:
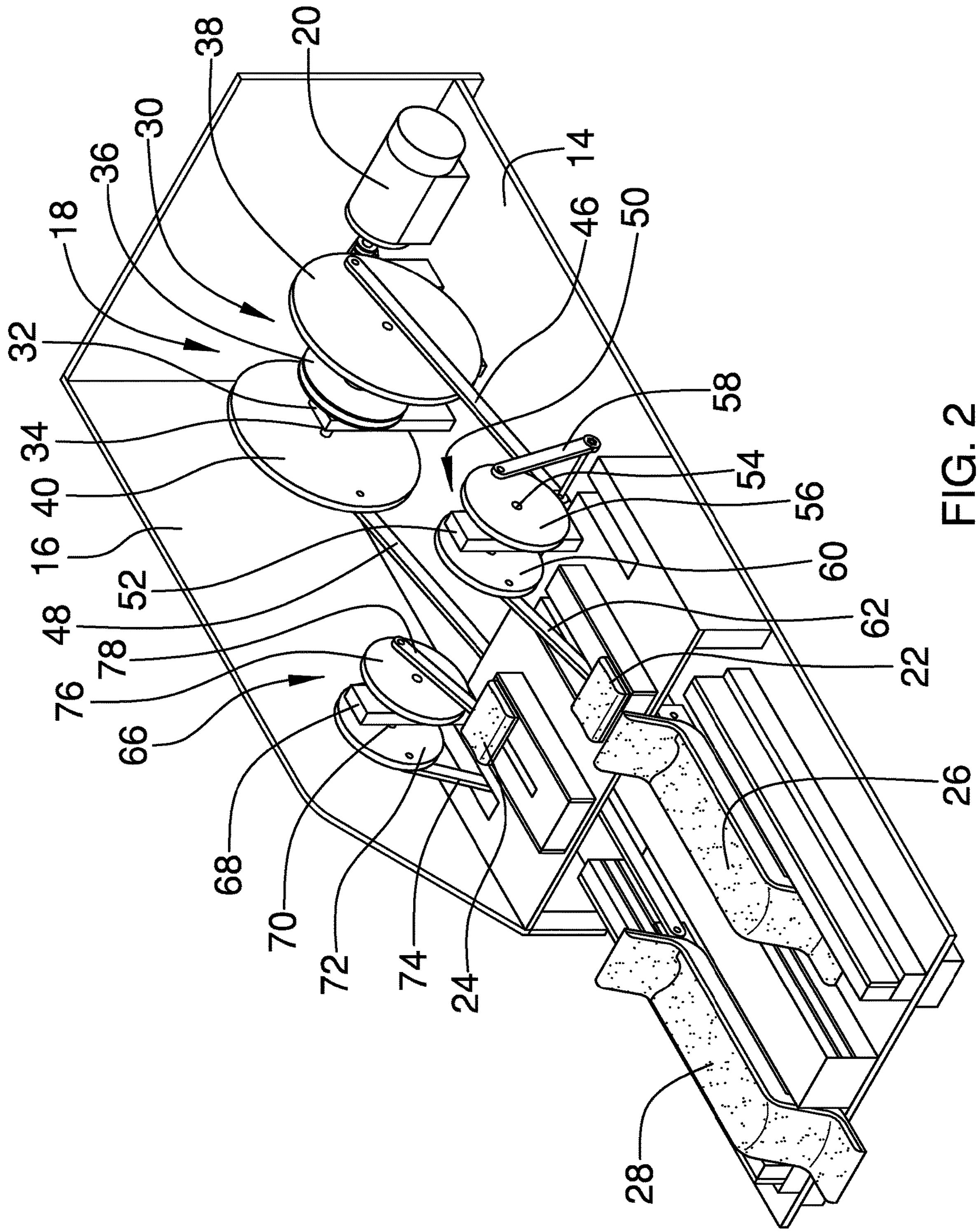
FIG. 2 is a partial cut-away top front side perspective view of an embodiment of the disclosure.
Figure 3:
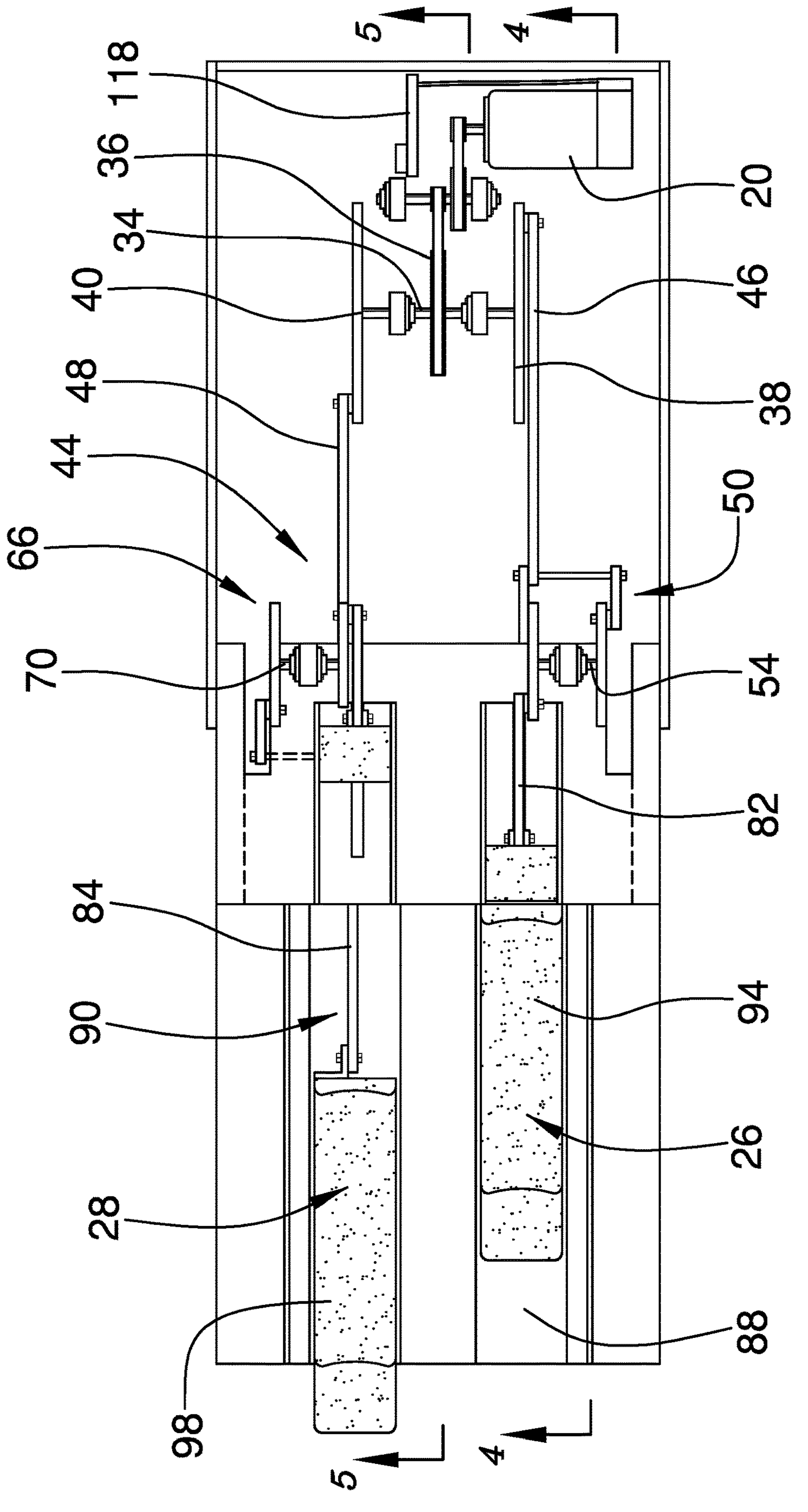
FIG. 3 is a top view of an embodiment of the disclosure.
Figure 4:
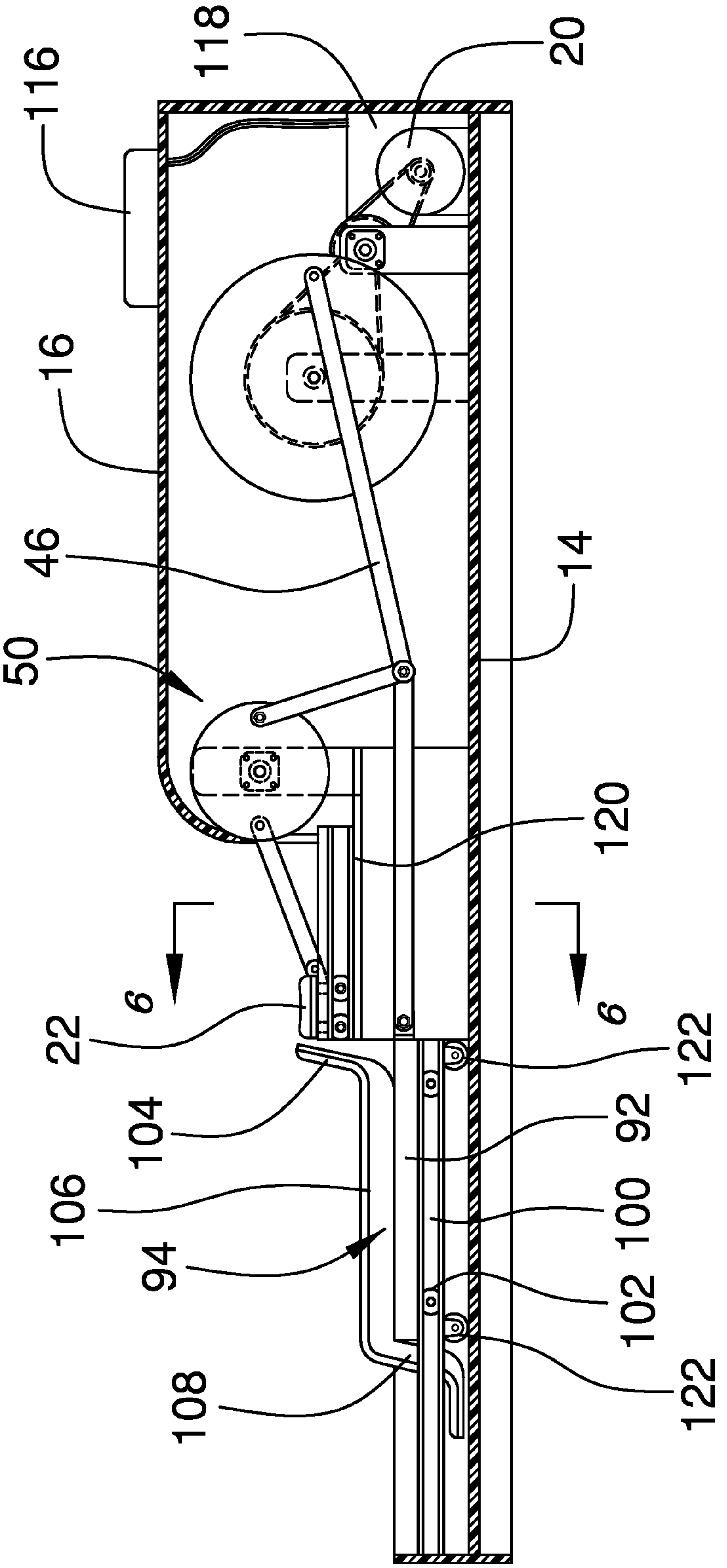
FIG. 4 is a cross-sectional view of an embodiment of the disclosure taken along line 4-4 of FIG. 3.
Figure 5:
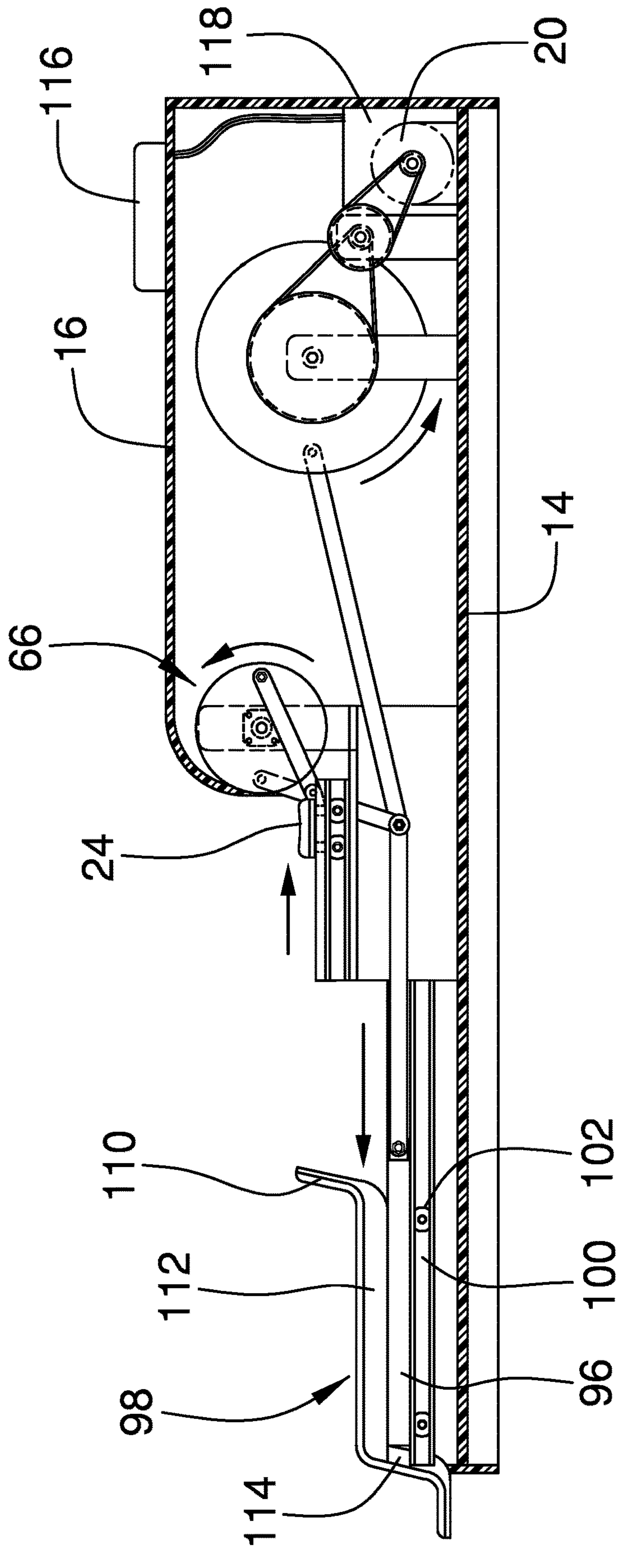
FIG. 5 is a cross-sectional view of an embodiment of the disclosure taken along line 5-5 of FIG. 3.
Figure 6:
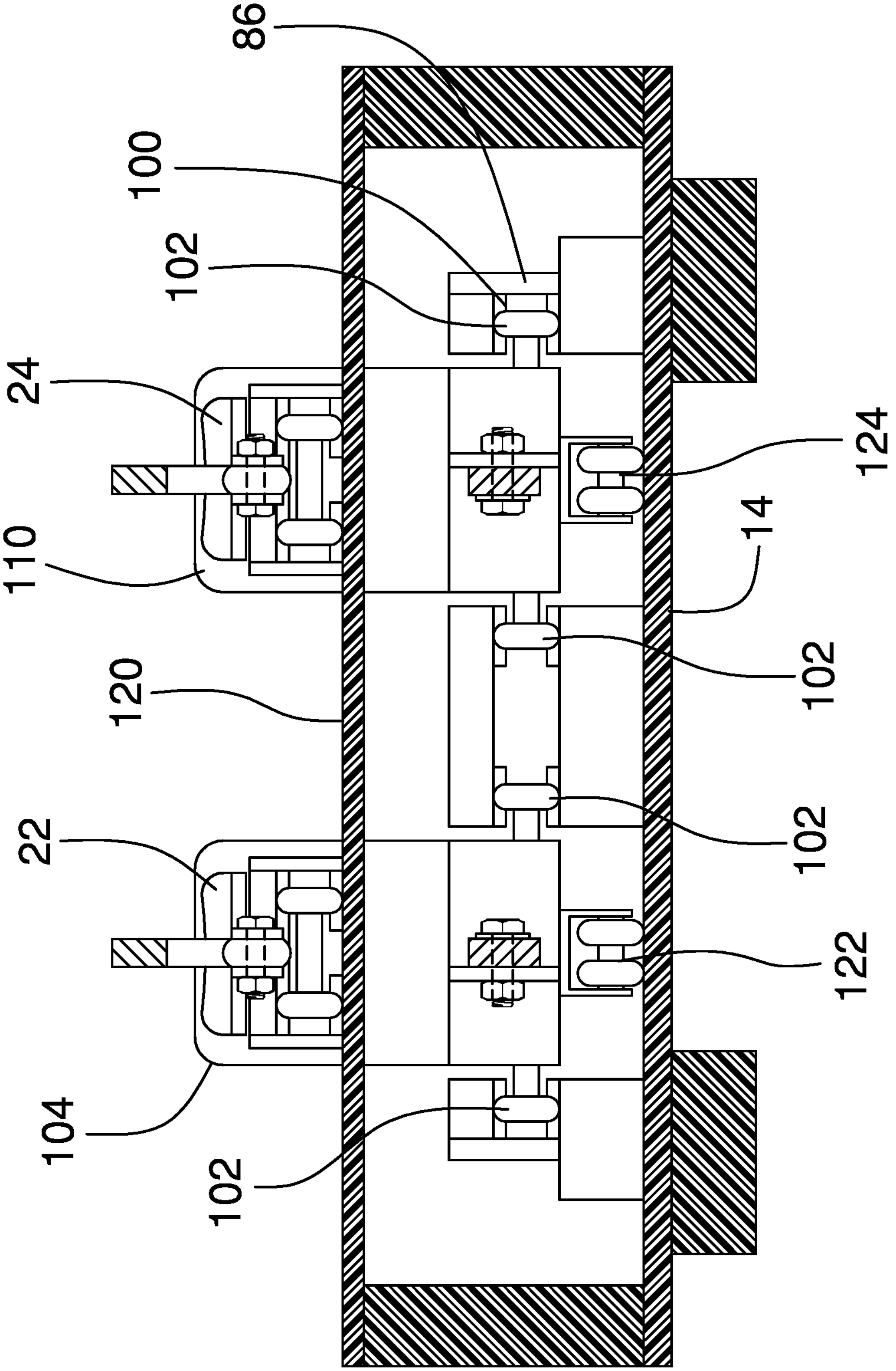
FIG. 6 is a cross-sectional view of an embodiment of the disclosure taken along line 6-6 of FIG. 4.
Figure 7:
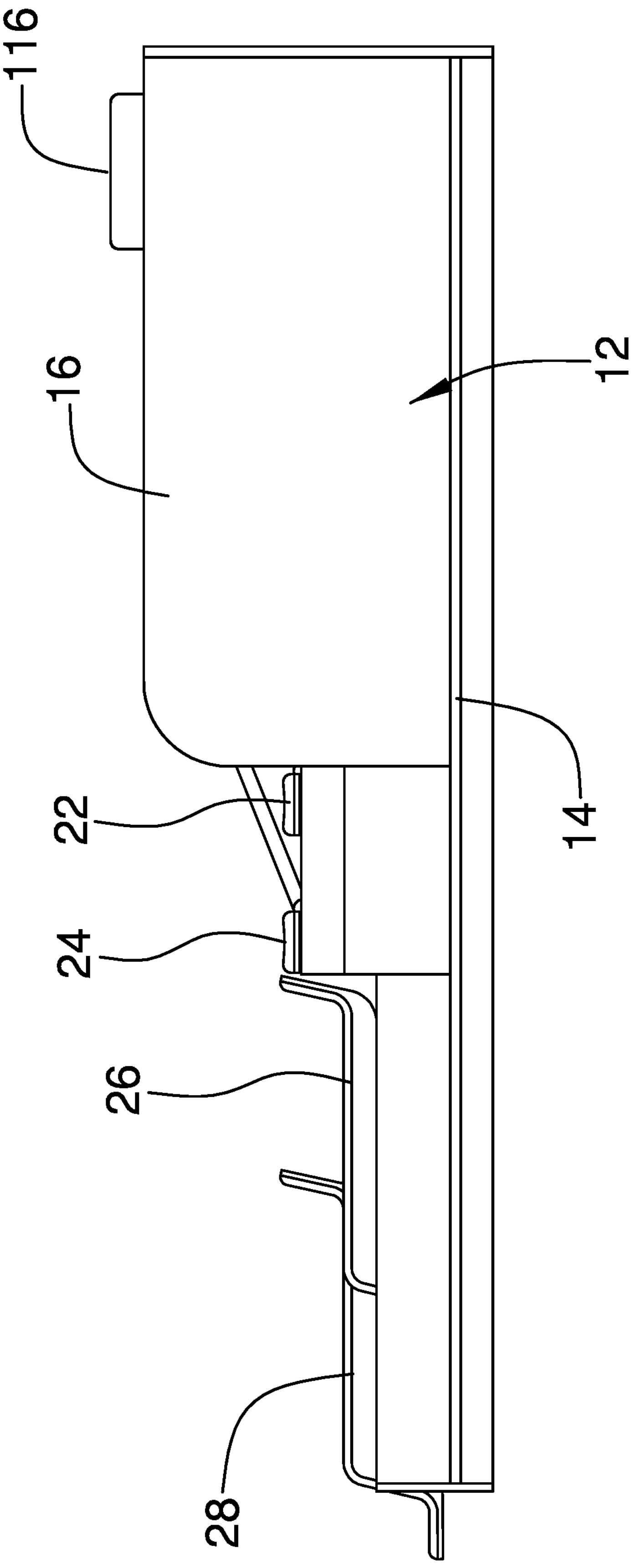
FIG. 7 is a side view of an embodiment of the disclosure.
Figure 8:
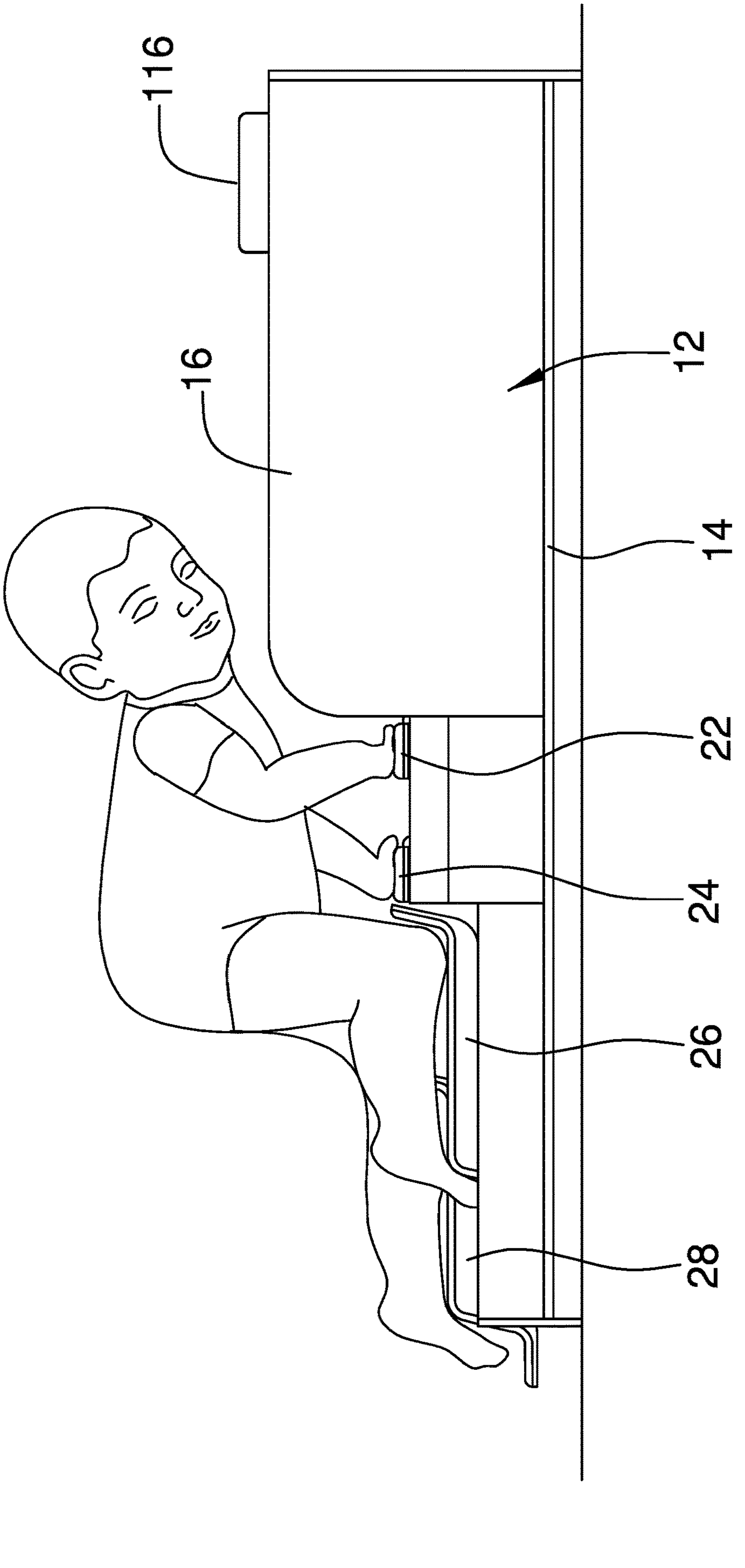
FIG. 8 is a side view of an embodiment of the disclosure in use.

With reference now to the drawings, and in particular to FIGS. 1 through 8 thereof, a new therapy device embodying the principles and concepts of an embodiment of the disclosure and generally designated by the reference numeral 10 will be described.

As best illustrated in FIGS. 1 through 8, the creeping motion therapy device 10 generally comprises a frame 12 having a base panel 14 and a shroud 16. The shroud 16 is coupled to the base panel 14 defining an interior space 18. A motor 20 is coupled to the frame 12 and positioned within the interior space 18. Each of a right paddle 22 and a left paddle 24 is coupled to the frame 12. Each of the right paddle 22 and the left paddle 24 is slidable relative to the frame 12. Each of a right leg support 26 and a left leg support 28 is coupled to the frame 12. Each of the right leg support 26 and the left leg support 28 is slidable relative to the frame 12. The right paddle 22, the left paddle 24, the right leg support 26, and the left leg support 28 are each positioned outside of the shroud 16. A main flywheel assembly 30 is coupled to the frame 12. The main flywheel assembly 30 is mechanically coupled to the motor 20. A linkage assembly 44 is mechanically coupled to the main flywheel assembly 30. Each of the right paddle 22, the left paddle 24, the right leg support 26, and the left leg support 28 is mechanically coupled to the linkage assembly 44 wherein the right paddle 22 and the left leg support 28 move alternately backward and forward in unison and the left paddle 24 and the right leg support 26 move in unison in opposite to the right paddle 22 and the left leg support 28 wherein the right paddle 22, left paddle 24, right leg support 26, and left leg support 28 mimic a creeping motion. The creeping motion is commonly alternatively described as a crawling motion. The motion is a natural form of infant movement prior to standing and learning to walk on two feet.

The main flywheel assembly 30 comprises a main flywheel stand 32 and a main flywheel axle 34 coupled to the main flywheel stand 32. A drive pulley 36 is coupled to the main flywheel axle 34. The drive pulley 36 rotates the main flywheel axle 34 when the drive pulley 36 is rotated. The drive pulley 36 is mechanically coupled to the motor wherein the motor 20 rotates the drive pulley 34. A right main flywheel 38 coupled to the main flywheel axle 34 such that the right main flywheel 38 is rotated by rotation of the main flywheel axle 34. The right main flywheel 38 is mechanically coupled to the right paddle 22 and the right leg support 26 wherein rotation of the right main flywheel 38 moves the right paddle 22 and the right leg support 26. A left main flywheel 40 is coupled to the main flywheel axle 34 such that the left main flywheel 40 is rotated by rotation of the main flywheel axle 34. The left main flywheel 40 is mechanically coupled to the left paddle 24 and the left leg support 28 wherein rotation of the left main flywheel moves the left paddle 24 and the left leg support 28.

The linkage assembly 44 includes a right main linkage 46 coupled to and extending from the right main flywheel 38 and a left main linkage 48 coupled to and extending from the left main flywheel 40. A right paddle flywheel assembly 50 is mechanically coupled to the right main linkage 46 and to the right paddle 22. The right paddle flywheel assembly 44 further includes a right paddle flywheel stand 52 and a right paddle axle 54 coupled to the right paddle flywheel stand 52. A primary right paddle flywheel 56 is coupled to the right paddle axle 54 such that the primary right paddle flywheel 52 is rotated by rotation of the right paddle axle 54. A primary right paddle flywheel linkage 58 is coupled between the right main linkage 46 and the primary right paddle flywheel 56. A secondary right paddle flywheel 60 is coupled to the right paddle axle 54 such that the secondary right paddle flywheel 60 is rotated by rotation of the paddle axle 54. A secondary right paddle linkage 62 is coupled to and extends between the secondary right paddle flywheel 60 and the right paddle 22. A right paddle block 64 is positioned on the frame 12. The right paddle 22 is slidably positioned on the right paddle block 64.

A left paddle flywheel assembly 66 is mechanically coupled to the left main linkage 48. The left paddle flywheel assembly 66 is mechanically coupled to the left paddle 24. The left paddle flywheel assembly 66 includes a left paddle flywheel stand 68 and a left paddle axle 70 coupled to the left paddle flywheel stand 68. A primary left paddle flywheel 72 is coupled to the left paddle axle 70 such that the primary left paddle flywheel 72 is rotated by rotation of the left paddle axle 70. A primary left paddle flywheel linkage 74 is coupled between the left main linkage 48 and the primary left paddle flywheel 72. A secondary left paddle flywheel 76 is coupled to the left paddle axle 70 such that the secondary left paddle flywheel 76 is rotated by rotation of the paddle axle 70. A secondary left paddle linkage 78 is coupled to and extends between the secondary left paddle flywheel 76 and the left paddle 24. A left paddle block 80 is coupled to the frame 12. The left paddle 24 is slidably positioned on the left paddle block 80. The right paddle block 64 and the left paddle block 80 may be positioned on paddle panel 120 of the frame 12 which is elevated above the base panel 14. The right paddle block 64 and the left paddle block 80 may also be slotted to allow for full free movement of the secondary right paddle linkage 62 and secondary left paddle linkage 78.

A right leg support linkage 82 is coupled to the right main linkage 46. The right leg support linkage 82 is coupled to the right leg support 26. Similarly, a left leg support linkage 84 is coupled to the left main linkage 48. The left leg support linkage 84 is coupled to the left leg support 28. A plurality of leg blocks 86 is coupled to and positioned on the base panel 14. Each of the leg blocks 86 is elongated. The leg blocks 86 are parallel and spaced to define a right skidtrack 88 and a left skidtrack 90. The right leg support 26 includes a right shuttle 92 and a right pad 94 positioned on the right shuttle 92. The right shuttle 92 is slidably positioned within the right skidtrack 88 and supported on support wheels 122. The left leg support 28 includes a left leg shuttle 96 and a left pad 98 positioned on the left shuttle 96. The left shuttle 96 is positioned within the left skidtrack 90 and supported on support wheels 124. The leg blocks 86 may have channels 100 to receive guide wheels 102 coupled to each of the right shuttle 92 and the left shuttle 96 to facilitate smooth movement of the right shuttle 92 and left shuttle 96.

The right pad 94 includes a right knee pad section 104, a right shin pad section 106, and a right toe pad section 108. The right knee pad section 104 extends up relative to the right shin pad section 106 allowing a knee to be positioned against the right knee pad section 104 for consistent positioning of a leg on the right leg support 26. The right toe pad section 108 extends down from the right shin pad section 106. The left pad 98 includes a left knee pad section 110, a left shin pad section 112, and a left toe pad section 114. A respective top surface of each of the right paddle 22 and the left paddle 24 are coplanar with each other and slightly elevated over a respective top surface of the right shin pad section 106 of the right pad 94 positioned on the right shuttle 92 and the left shin pad section 112 of the left pad 98 positioned on the left shuttle 96.

A control panel 116 is positioned on the shroud 16. The control panel 116 is operationally coupled to the motor 20 wherein rotation of the drive pulley 36 is controllable by manipulation of the control panel 116. A circuit board 118 is positioned within the interior space 18. The circuit board 118 is operationally coupled to the motor and the control panel 116. Programming associated with the circuit board 118 provides for control of speed, duration, and other parameters of movement of the right paddle 22, left paddle 24, right leg support 26, and left leg support 28.

In use, a person, typically a child, is positioned on the device 10 with a right hand grasping the right paddle 22, left hand grasping the left paddle 24, right leg on the right leg support 26, and left leg on the left leg support 28. The motor 20 is activated to rotate the drive pulley 36. The linkage assembly 44 transfers the movement of the drive pulley 36 to each of the right paddle 22, left paddle 24, right leg support 26, and left leg support 28. The hands and legs of the person on the device 10 are then moved mimicking the creeping motion for therapeutic development of proper muscle movement when the person is not on the device 10.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A creeping motion therapy device comprising:
- a frame;
- a motor coupled to said frame;
- a right paddle and a left paddle, each of said right paddle and said left paddle being coupled to said frame, each of said right paddle and said left paddle being slidable relative to said frame;
- a right leg support and a left leg support, each of said right leg support and said left leg support being coupled to said frame, each of said right leg support and said left leg support being slidable relative to said frame; and
- a main flywheel assembly coupled to said frame, said main flywheel assembly being mechanically coupled to said motor;
- a linkage assembly being mechanically coupled to said main flywheel assembly;
- each of said right paddle, said left paddle, said right leg support, and said left leg support being mechanically coupled to said linkage assembly wherein said right paddle and said left leg support move alternately backward and forward in unison and said left paddle and said right leg support move in unison in opposite to said right paddle and said left leg support wherein said right paddle, left paddle, right leg support, and left leg support mimic a creeping motion; and
- wherein said main flywheel assembly comprises:
  - a main flywheel stand;
  - a main flywheel axle coupled to said main flywheel stand;
  - a drive pulley coupled to said main flywheel axle, said drive pulley rotating said axle when said drive pulley is rotated, said drive pulley being mechanically coupled to said motor wherein said motor rotates said drive pulley;
  - a right main flywheel coupled to said axle such that said right main flywheel is rotated by rotation of said main flywheel axle, said right main flywheel being mechanically coupled to said right paddle and said right leg support wherein rotation of said right main flywheel moves said right paddle and said right leg support; and
  - a left main flywheel coupled to said axle such that said left main flywheel is rotated by rotation of said main flywheel axle, said left main flywheel being mechanically coupled to said left paddle and said left leg support wherein rotation of said left main flywheel moves said left paddle and said left leg support.

2. The creeping motion therapy device of claim 1, wherein said frame comprises:
- a base panel;
- a shroud coupled to said base panel, said shroud defining an interior space, said motor being positioned within said interior space, said right paddle, said left paddle, said right leg support, and said left leg support each being positioned outside of said shroud.

3. The creeping motion therapy device of claim 2, further comprising:
- a plurality of leg blocks coupled to and positioned on said base panel, said leg blocks being elongated, parallel and spaced to define a right skidtrack and a left skidtrack;
- said right leg support comprising a right shuttle and a right pad positioned on said right shuttle, said right shuttle being slidably positioned within said right skidtrack;
- said left leg support comprising a left leg shuttle and a left pad positioned on said left shuttle, said left shuttle being positioned within said left skidtrack.

4. The creeping motion therapy device of claim 3, further comprising:
- a right paddle block, said right paddle being slidably positioned on said right paddle block;
- a left paddle block, said left paddle being slidably positioned on said left paddle block.

5. The creeping motion therapy device of claim 4 wherein a respective top surface of each of said right paddle and said left paddle are coplanar with each other and elevated above a respective top surface of a right shin pad section of a right pad positioned on said right shuttle and a left shin pad section of a left pad positioned on said left shuttle.

6. The creeping motion therapy device of claim 2, further comprising:
- a control panel, said control panel being positioned on said shroud, said control panel being operationally coupled to said motor wherein rotation of said drive pulley is controllable by manipulation of said control panel.

7. The creeping motion therapy device of claim 6, further comprising a circuit board being positioned within said interior space, said circuit board being operationally coupled to said motor and said control panel.

8. The creeping motion therapy device of claim 1, wherein said linkage assembly comprises:
- a right main linkage coupled to and extending from said right main flywheel;
- a left main linkage coupled to and extending from said left main flywheel;
- a right paddle flywheel assembly mechanically coupled to said right main linkage, said right paddle flywheel assembly being mechanically coupled to said right paddle;
- a left paddle flywheel assembly mechanically coupled to said left main linkage, said left paddle flywheel assembly being mechanically coupled to said left paddle;
- a right leg support linkage coupled to said right main linkage, said right leg support linkage being coupled to said right leg support; and
- a left leg support linkage coupled to said left main linkage, said left leg support linkage being coupled to said left leg support.

9. The creeping motion therapy device of claim 8, comprising:
- said right paddle flywheel assembly comprising
  - a right paddle flywheel stand,
  - a right paddle axle coupled to said right paddle flywheel stand,
  - a primary right paddle flywheel coupled to said right paddle axle such that said primary right paddle flywheel is rotated by rotation of said right paddle axle, a primary right paddle flywheel linkage coupled between said right main linkage and said primary right paddle flywheel, a secondary right paddle flywheel coupled to said right paddle axle such that said secondary right paddle flywheel is rotated by rotation of said paddle axle, and a secondary right paddle linkage coupled to and extending between said secondary right paddle flywheel and said right paddle; and said left paddle flywheel assembly comprising:

a left paddle flywheel stand, a left paddle axle coupled to said left paddle flywheel stand, a primary left paddle flywheel coupled to said left paddle axle such that said primary left paddle flywheel is rotated by rotation of said left paddle axle, a primary left paddle flywheel linkage coupled between said left main linkage and said primary left paddle flywheel, a secondary left paddle flywheel coupled to said left paddle axle such that said secondary left paddle flywheel is rotated by rotation of said paddle axle, and a secondary left paddle linkage coupled to and extending between said secondary left paddle flywheel and said left paddle.

10. The creeping motion therapy device of claim 1, further comprising:

said right leg support comprising a right shuttle and a right pad positioned on said right shuttle; and said left leg support comprising a left leg shuttle and a left pad positioned on said left shuttle.

11. The creeping motion therapy device of claim 10, further comprising:

said right pad including a right knee pad section, a right shin pad section, and a right toe pad section; and said left pad including a left knee pad section, a left shin pad section, and a left toe pad section.

12. A creeping motion therapy device comprising:

a frame;

a motor coupled to said frame;

a right paddle and a left paddle, each of said right paddle and said left paddle being coupled to said frame, each of said right paddle and said left paddle being slidable relative to said frame;

a right leg support and a left leg support, each of said right leg support and said left leg support being coupled to said frame, each of said right leg support and said left leg support being slidable relative to said frame; and a main flywheel assembly coupled to said frame, said main flywheel assembly being mechanically coupled to said motor;

a linkage assembly being mechanically coupled to said main flywheel assembly;

each of said right paddle, said left paddle, said right leg support, and said left leg support being mechanically coupled to said linkage assembly wherein said right paddle and said left leg support move alternately backward and forward in unison and said left paddle and said right leg support move in unison in opposite to said right paddle and said left leg support wherein said right paddle, left paddle, right leg support, and left leg support mimic a creeping motion;

wherein said frame comprises a base panel, and a shroud coupled to said base panel, said shroud defining an interior space, said motor being positioned within said interior space, said right paddle, said left paddle, said right leg support, and said left leg support each being positioned outside of said shroud;

wherein said main flywheel assembly comprises a main flywheel stand, a main flywheel axle coupled to said main flywheel stand, a drive pulley coupled to said main flywheel axle, said drive pulley rotating said axle when said drive pulley is rotated, said drive pulley being mechanically coupled to said motor wherein said motor rotates said drive pulley, a right main flywheel coupled to said axle such that said right main flywheel is rotated by rotation of said main flywheel axle, said right main flywheel being mechanically coupled to said right paddle and said right leg support wherein rotation of said right main flywheel moves said right paddle and said right leg support, and a left main flywheel coupled to said axle such that said left main flywheel is rotated by rotation of said main flywheel axle, said left main flywheel being mechanically coupled to said left paddle and said left leg support wherein rotation of said left main flywheel moves said left paddle and said left leg support;

wherein said linkage assembly comprises a right main linkage coupled to and extending from said right main flywheel, a left main linkage coupled to and extending from said left main flywheel, a right paddle flywheel assembly mechanically coupled to said right main linkage, said right paddle flywheel assembly being mechanically coupled to said right paddle, a left paddle flywheel assembly mechanically coupled to said left main linkage, said left paddle flywheel assembly being mechanically coupled to said left paddle, a right leg support linkage coupled to said right main linkage, said right leg support linkage being coupled to said right leg support, and a left leg support linkage coupled to said left main linkage, said left leg support linkage being coupled to said left leg support;

said right leg support comprising a right shuttle and a right pad positioned on said right shuttle;

said left leg support comprising a left leg shuttle and a left pad positioned on said left shuttle;

said right pad including a right knee pad section, a right shin pad section, and a right toe pad section; and said left pad including a left knee pad section, a left shin pad section, and a left toe pad section;

a plurality of leg blocks coupled to and positioned on said base panel, said leg blocks being elongated, parallel and spaced to define a right skidtrack and a left skidtrack;

said right leg support comprising a right shuttle and a right pad positioned on said right shuttle, said right shuttle being slidably positioned within said right skidtrack;

said left leg support comprising a left leg shuttle and a left pad positioned on said left shuttle, said left shuttle being positioned within said left skidtrack;

a right paddle block, said right paddle being slidably positioned on said right paddle block;

a left paddle block, said left paddle being slidably positioned on said left paddle block;

wherein a respective top surface of each of said right paddle and said left paddle are coplanar with each other and elevated above a respective top surface of said right shin pad section of said right pad positioned on said right shuttle and said left shin pad section of said left pad positioned on said left shuttle;

said right paddle flywheel assembly comprising a right paddle flywheel stand, a right paddle axle coupled to said right paddle flywheel stand, a primary right paddle flywheel coupled to said right paddle axle such that said primary right paddle flywheel is rotated by rotation of said right paddle axle, a primary right paddle flywheel linkage coupled between said right main linkage and said primary right paddle flywheel, a secondary right paddle flywheel coupled to said right paddle axle such that said secondary right paddle flywheel is rotated by rotation of said paddle axle, and a secondary right paddle linkage coupled to and extending between said secondary right paddle flywheel and said right paddle;

said left paddle flywheel assembly comprising:

a left paddle flywheel stand, a left paddle axle coupled to said left paddle flywheel stand, a primary left paddle flywheel coupled to said left paddle axle such that said primary left paddle flywheel is rotated by rotation of said left paddle axle, a primary left paddle flywheel linkage coupled between said left main linkage and said primary left paddle flywheel, a secondary left paddle flywheel coupled to said left paddle axle such that said secondary left paddle flywheel is rotated by rotation of said paddle axle, and a secondary left paddle linkage coupled to and extending between said secondary left paddle flywheel and said left paddle;

a control panel, said control panel being positioned on said shroud, said control panel being operationally coupled to said motor wherein rotation of said drive pulley is controllable by manipulation of said control panel; and a circuit board being positioned within said interior space, said circuit board being operationally coupled to said motor and said control panel.

* * * * *